United States Patent
Hong

(10) Patent No.: US 10,490,100 B2
(45) Date of Patent: Nov. 26, 2019

(54) APPARATUS AND METHOD FOR CONTROLLING HYBRID DISPLAY FOR PROVIDING BOTH TACTILITY AND SENSE OF TEMPERATURE

(71) Applicant: ELECTRONICS AND TELECOMMUNICATIONS RESEARCH INSTITUTE, Daejeon (KR)

(72) Inventor: Hyo-Bong Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 436 days.

(21) Appl. No.: 15/208,095

(22) Filed: Jul. 12, 2016

(65) Prior Publication Data

US 2017/0206807 A1     Jul. 20, 2017

(30) Foreign Application Priority Data

Jan. 15, 2016  (KR) .................. 10-2016-0005063

(51) Int. Cl.
*G09B 21/00* (2006.01)

(52) U.S. Cl.
CPC ................. *G09B 21/004* (2013.01)

(58) Field of Classification Search
CPC ... G09B 21/003; G09B 21/004; G09B 21/007
See application file for complete search history.

(56) References Cited

U.S. PATENT DOCUMENTS

| 3,681,773 | A  | * | 8/1972  | Russell  | G05D 3/14 |
|           |    |   |         |          | 318/562   |
| 6,462,840 | B1 | * | 10/2002 | Kravtsov | G09F 9/33 |
|           |    |   |         |          | 358/474   |
| 2003/0151597 | A1 | * | 8/2003 | Roberts | G09B 21/004 |
|           |    |   |         |          | 345/173   |
| 2005/0098044 | A1 | * | 5/2005 | Spedden | G09B 21/003 |
|           |    |   |         |          | 99/325    |

(Continued)

FOREIGN PATENT DOCUMENTS

| KR | 10-0787952 B1    | 12/2007 |
| KR | 10-2009-0111670 A | 10/2009 |

(Continued)

OTHER PUBLICATIONS

Jungil Jung et al., "Design and Implementation of Real-time Haptic Display System," The Institute of Electronics and Information Engineers, 2011, pp. 141-148.

*Primary Examiner* — Bruk A Gebremichael

(57) ABSTRACT

Disclosed herein are an apparatus and method for controlling a hybrid display that provides both tactility and a sense of temperature. The apparatus for controlling a hybrid display includes a data acquisition unit for receiving display data for representing both tactility and a sense of temperature from a user, a shape control unit for displaying a 3-dimensional shape that provides tactility by controlling a haptic head installed in an X-Y plotter based on the display data, and a temperature control unit for providing a sense of temperature to the 3-dimensional shape based on the display data.

12 Claims, 6 Drawing Sheets

(56) References Cited

U.S. PATENT DOCUMENTS

| | | | |
|---|---|---|---|
| 2005/0158695 A1* | 7/2005 | Takahashi | G09B 21/004 |
| | | | 434/113 |
| 2008/0129705 A1 | 6/2008 | Kim et al. | |
| 2008/0218488 A1 | 9/2008 | Yang et al. | |
| 2014/0055377 A1* | 2/2014 | Kim | G06F 3/0418 |
| | | | 345/173 |

FOREIGN PATENT DOCUMENTS

| | | |
|---|---|---|
| KR | 10-2010-0125059 A | 11/2010 |
| KR | 10-2014-0060343 A | 5/2014 |
| KR | 10-1448832 B1 | 10/2014 |
| WO | WO 2013/036614 A1 | 3/2013 |

\* cited by examiner

APPARATUS AND METHOD FOR CONTROLLING HYBRID DISPLAY FOR PROVIDING BOTH TACTILITY AND SENSE OF TEMPERATURE

CROSS REFERENCE TO RELATED APPLICATION

This application claims the benefit of Korean Patent Application No. 10-2016-0005063, filed Jan. 15, 2016, which is hereby incorporated by reference in its entirety into this application.

BACKGROUND OF THE INVENTION

1. Technical Field

The present invention relates generally to an apparatus for controlling a hybrid display that provides both tactility and a sense of temperature. More particularly, the present invention relates to technology for controlling a hybrid display that provides both tactility and a sense of temperature, which enables a user to feel both a sense of touch and a sense of temperature by supplying heat to a 3-dimensional shape on which a texture is reproduced.

2. Description of the Related Art

Recently, haptic display devices (including tactile displays), which are under development, may be largely categorized into two kinds based on the way in which tactility is presented, that is, a display in which a tactile sensation is conveyed by moving up an array of pins and a display in which a tactile sensation is conveyed by spatially distributed force generated by swollen polymers.

First, in the case of a mechanical method using solenoid valves or hydraulic pressure, a desired tactile sensation may be presented in such a way that pins that are fixed to the required number of solenoid valves or motors are actuated by being electrically controlled. Because this method uses a structure that may be simply configured and easily manipulated, there is no problem in reproducing simple texture, but it is technically difficult to represent information about shapes of figures or graphs. For example, a haptic display may present tactility or a sense of touch using vibrations with varying intensity and frequency in order to represent the texture of a specific part, but may not represent a 2-dimensional or 3-dimensional shape. Particularly, tactile information having a contact area corresponding to the size of the display area of a general display cannot be displayed using the existing method employing an array of pins. In this case, because the pins are limited as to the structure thereof, regardless of the kind of material forming the pin array, it is a common problem of tactile displays using an array of pins.

Alternatively, in order to solve the above-mentioned problem, there is provided a method in which the property of the surface of a currently used display is changed by being supplied with electrical power, whereby haptic information (mainly tactile information) having a relatively large contact area may be displayed. This method may display tactile information having a contact area that has a size similar to that of a currently used general display. However, because this method uses electrostatic attraction on the surface, tactile information may be conveyed weakly compared to the method using an array of pins.

In connection with this, Korean Patent Application Publication No. 10-2010-0125059, discloses a technology related to "Tactile display system and operation method using the same."

SUMMARY OF THE INVENTION

An object of the present invention is to provide technology for controlling a hybrid display that may convey haptic or tactile information, which cannot be conveyed by a visual display, along with a 2-dimensional or 3-dimensional model.

Another object of the present invention is to provide a device for displaying figures, graphs, and pictures on printouts such as books using tactility or a sense of touch provided by applying force, rather than using the sense of sight, as if provided by currently used CRT, LCD, and OLED displays.

A further object of the present invention is to provide technology for controlling a hybrid display that is capable of effective delivery of information in application fields such as educational tools for the visually handicapped or surgery simulations in the medical field.

Yet another object of the present invention is to provide technology for a display that may convey various kinds of cognitive information.

In order to accomplish the above object, an apparatus for controlling a hybrid display according the present invention includes a data acquisition unit for receiving display data for representing both tactility and a sense of temperature from a user; a shape control unit for displaying a 3-dimensional shape that provides tactility by controlling a haptic head installed in an X-Y plotter based on the display data; and a temperature control unit for providing a sense of temperature to the 3-dimensional shape based on the display data.

The display data may include at least one of shape data, which include shape coordinates for displaying the 3-dimensional shape, and temperature data, which include temperature coordinates for providing the sense of temperature.

The shape control unit may display the 3-dimensional shape by protruding a silicon cover, which is located horizontally over the X-Y plotter, using the haptic head, which moves corresponding to an X-axis and Y-axis of the X-Y plotter.

The shape control unit may protrude the silicon cover using at least one of a method in which the haptic head moves partway along a Z-axis of the X-Y plotter at a position corresponding to the shape coordinates and a method in which multiple pins protrude from a pin array, which is included in the haptic head, so as to correspond to the shape coordinates.

The temperature control unit may provide the sense of temperature by conveying vibrations corresponding to a preset frequency to the multiple pins at a position corresponding to the temperature coordinates using a vibration motor connected to the haptic head.

The multiple pins may provide the sense of temperature based on at least one of a thermoelement and a hot wire.

The shape control unit may move the haptic head by controlling at least one of an X-axis drive motor and a Y-axis drive motor of the X-Y plotter to correspond to the shape coordinates.

Also, a method for controlling a hybrid display according to an embodiment of the present invention includes receiving display data for representing both tactility and a sense of temperature from a user; displaying a 3-dimensional shape that provides tactility by controlling a haptic head installed in an X-Y plotter based on the display data; and providing a sense of temperature to the 3-dimensional shape based on the display data.

The display data may include at least one of shape data, which include shape coordinates for displaying the 3-dimensional shape, and temperature data, which include temperature coordinates for providing the sense of temperature.

Displaying the 3-dimensional shape may be configured to display the 3-dimensional shape by protruding a silicon cover, which is located horizontally over the X-Y plotter, using the haptic head, which moves corresponding to an X-axis and Y-axis of the X-Y plotter.

Displaying the 3-dimensional shape may be configured to protrude the silicon cover using at least one of a method in which the haptic head moves partway along a Z-axis of the X-Y plotter at a position corresponding to the shape coordinates and a method in which multiple pins protrude from a pin array, which is included in the haptic head, to correspond to the shape coordinates.

Providing the sense of temperature may be configured to provide the sense of temperature by conveying vibrations corresponding to a preset frequency to the multiple pins at a position corresponding to the temperature coordinates using a vibration motor connected to the haptic head.

The multiple pins may provide the sense of temperature based on at least one of a thermoelement and a hot wire.

Displaying the 3-dimensional shape may be configured to move the haptic head by controlling at least one of an X-axis drive motor and a Y-axis drive motor of the X-Y plotter to correspond to the shape coordinates.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
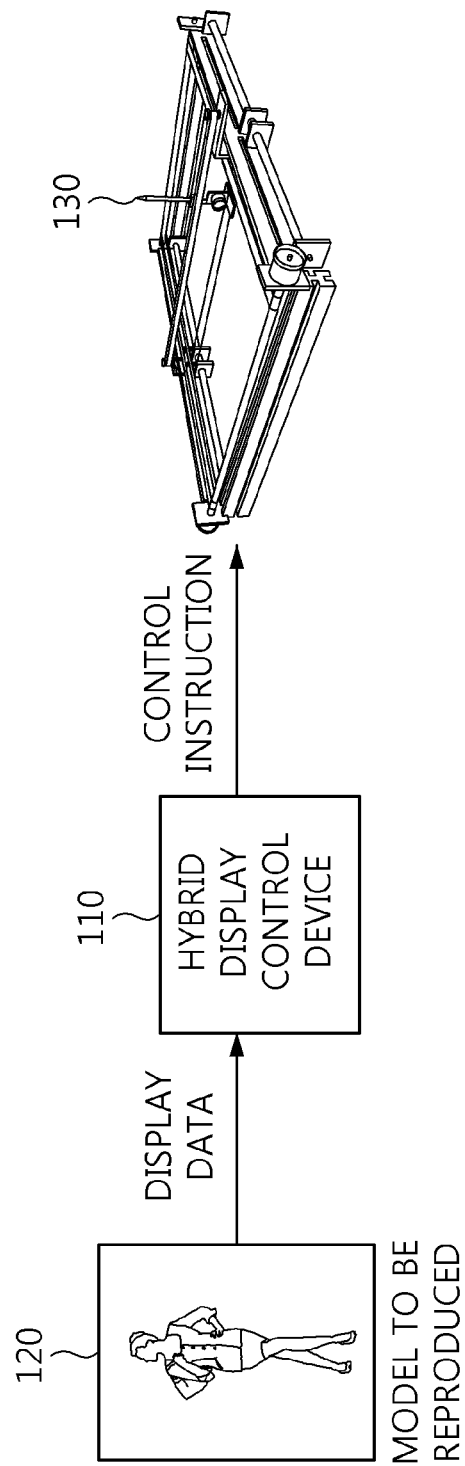
FIG. 1 is a view illustrating a system for controlling a hybrid display according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment according to the present invention will be described in detail with reference to the accompanying drawings.

FIG. 1 is a view illustrating a system for controlling a hybrid display according to an embodiment of the present invention.

Referring to FIG. 1, the system for controlling a hybrid display according to an embodiment of the present invention includes a hybrid display control device 110, a model to be reproduced 120, and a display device 130.

Here, in order to convey both tactility and a sense of temperature using the hybrid display control device 110, the model to be reproduced 120 may be input by a user in a format corresponding to display data.

Here, the model to be reproduced 120 may include information about the 2-dimensional shape.

Here, the display data may include shape data corresponding to the contour of the model to be reproduced 120 and the detailed internal shape of the model. For example, it may be assumed that the texture of the model to be reproduced 120 is realized by protruding a silicon cover using the display device 130. Here, because the shape data include shape coordinates that correspond to the contour and internal shape of the model to be reproduced 120, the display device 130 may protrude the silicon cover so as to correspond to the shape of the model to be reproduced 120 based on the shape coordinates.

Also, the display data may include temperature data in order to present a sense of temperature, in addition to the shape of the model to be reproduced 120. For example, in the process of protruding the silicon cover in order to shape the model to be reproduced 120 so as to be touchable, it is assumed that a sense of temperature is presented to parts corresponding to the two hands of a person in the model. Here, on the silicon cover to be protruded, the coordinates of the parts corresponding to the two hands of the model to be reproduced 120 are set to temperature coordinates, and the temperature coordinates are included in the temperature data, whereby the display device 130 may provide a sense of temperature at the corresponding position.

Here, the sense of temperature may be presented by providing a fixed frequency of vibration to an array of pins, which protrude the silicon cover, using a vibration motor installed in the display device 130.

Here, the display device 130 may be an X-Y plotter, which moves a haptic head along X and Y axes.

Figure 2:
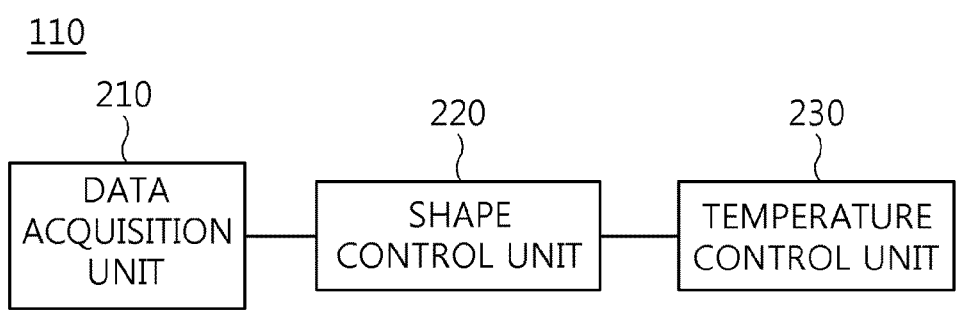
FIG. 2 is a view illustrating an example of the hybrid display control device illustrated in FIG. 1.

FIG. 2 is a block diagram illustrating an example of the hybrid display control device illustrated in FIG. 1.

Referring to FIG. 2, the hybrid display control device illustrated in FIG. 1 includes a data acquisition unit 210, a shape control unit 220, and a temperature control unit 230.

The data acquisition unit 210 receives display data for presenting both tactility and a sense of temperature from a user.

Here, the display data may be data that include information about the 2-dimensional shape of an object to which a user intends to present tactility and a sense of temperature.

Also, the display data may include information about the contour of the object to be represented or the detailed internal shape of the object.

Here, the display data may include at least one of shape data, which include shape coordinates for representing a 3-dimensional shape, and temperature data, which include temperature coordinates for providing a sense of temperature.

Here, the shape coordinates may be the coordinates of the position at which the 3-dimensional shape is to be displayed on a specific layer, on which 3-dimensional shapes are displayed. Also, the temperature coordinates may be the coordinates of the position at which both tactility and a sense of temperature are provided on the specific layer, on which 3-dimensional shapes are displayed.

The shape control unit 220 represents the 3-dimensional shape, which provides tactility by controlling the haptic head installed in the X-Y plotter based on the display data. That is, the 3-dimensional shape may be displayed by moving the haptic head to correspond to the display data using the X-Y plotter.

Here, the 3-dimensional shape may be a shape that can be touched with the user's hands or skin. For example, if a 2-dimensional bar graph is represented as a 3-dimensional shape, the bar on the graph may be represented as a shape that can be touched with the hands. Also, in another example, a human heart is represented as a 3-dimensional shape in the medical field, whereby the shape and texture of the heart figure may be reproduced so as to be touchable.

Here, the 3-dimensional shape may be displayed by protruding a silicon cover, which is horizontally located over the X-Y plotter, to correspond to the shape coordinates using the haptic head, which moves along the X-axis and Y-axis of the X-Y plotter. Specifically, the 3-dimensional shape may be displayed in such a way that, when the haptic head reaches the shape coordinates at which the 3-dimensional shape is to be displayed while moving under the silicon cover, the haptic head causes the silicon cover to protrude at the corresponding position.

Here, the silicon cover may have a size corresponding to the X and Y axes of the X-Y plotter. That is, because the coordinates on the silicon cover are connected with the shape coordinates based on the X and Y axes of the X-Y plotter, the 2-dimensional data that a user intends to represent may be displayed so as to correspond to a 3-dimensional shape.

Also, in addition to a silicon cover, a layer made of another material, which has an effect similar to that of the silicon cover, can be used as a shaping layer for forming a 3-dimensional shape.

Here, the silicon cover may be protruded using at least one of a method in which the haptic head moves partway along the Z-axis of the X-Y plotter at the position corresponding to the shape coordinates and a method in which multiple pins protrude from a pin array, which is included in the haptic head, so as to correspond to the shape coordinates. That is, in order to protrude the silicon cover, it is necessary to push out the silicon cover using the haptic head, which moves through the X-Y plotter. Therefore, the silicon cover may be protruded by moving the haptic head partway along the Z-axis, which corresponds to the orientation of the silicon cover, or by protruding the pin array included in the haptic head.

Here, in the surface of the object corresponding to the 3-dimensional shape, a part having a relatively rigid and rough texture can be reproduced by mechanically moving the haptic head itself along the Z-axis. Also, a part having a sharp and elaborate texture may be reproduced by protruding multiple pins using a pin array included in the haptic head.

Here, the haptic head may be moved by controlling at least one of an X-axis drive motor and a Y-axis drive motor of the X-Y plotter so as to correspond to the shape coordinates. That is, the haptic head may be moved so as to correspond to the shape coordinates by controlling both the X-axis drive motor and the Y-axis drive motor simultaneously, or by controlling the X-axis drive motor and the Y-axis drive motor individually.

Here, the X-axis drive motor and the Y-axis drive motor may be controlled by transmitting instruction data for controlling each of the motors to the X-Y plotter. For example, a control signal of a stepper motor driver is input in order to operate the X-Y plotter, and the operation may be controlled using the Arduino platform or a LabVIEW module. Here, a fundamental drive system for the X-Y plotter may be controlled using USB devices of National Instruments, and other parts may be controlled by connecting the Arduino system thereto.

The temperature control unit 230 provides a sense of temperature to the 3-dimensional shape based on the display data. That is, a sense of temperature may be provided so as to enable a user to feel a sense of warmth at a specific part when touching the 3-dimensional shape, which is displayed by protruding a silicon cover.

Here, the sense of temperature may be provided by conveying vibrations at a preset frequency to the multiple pins at the position corresponding to the temperature coordinates using a vibration motor connected to the haptic head.

For example, when a human hand is represented as a 3-dimensional shape according to the present invention, it may be assumed that the 3-dimensional shape is displayed such that a sense of warmth is provided only to the palm. Here, among the coordinates on the silicon cover, the coordinates corresponding to the palm are set as temperature coordinates, and the preset frequency of vibration is conveyed to the multiple pins while the palm is displayed, whereby a sense of temperature may be presented to the part corresponding to the palm in the protrusion of the silicon cover.

Here, the multiple pins may provide a sense of temperature using at least one of thermoelements and hot wires. For example, a sense of temperature may be provided in such a way that a Peltier module, which is one kind of thermoelement, is applied to the multiple pins and heat is absorbed into or output by the Peltier module when power is supplied thereto. As another example, if hot wires are wound around the multiple pins and vibrations are conveyed thereto using a vibration motor, the vibrations are not immediately delivered to the user's hand on the 3-dimensional shape, but soft vibrations are conveyed via the wires wound around the multiple pins, whereby a sense of temperature may be provided.

Here, because the pin array for providing the sense of temperature is installed in the haptic head, both tactility and a sense of temperature are presented at the same time based on consecutive movements of the haptic head.

Here, a signal generator may be used in order to deliver a signal for providing a sense of temperature at the position corresponding to the temperature coordinates.

As described above, according to the present invention, two kinds of important information, which cannot be presented by general display devices, that is, tactility and a sense of temperature, may be provided.

For example, until now, the visually impaired may recognize characters using a Braille system, but cannot recognize 2-dimensional or 3-dimensional information displayed on a screen. Also, in order to represent such information displayed on a screen using conventional technology, a minimum of hundreds of thousands to millions of microarrays is needed, and thus the size of a display device may exceed hundreds of inches. Also, because Electro-Active Polymers (EAPs) require voltage of thousands of volts in order to operate and the resolution thereof is inferior to that of the mechanical microarrays, it is difficult to use them in practical.

However, the present invention may represent an overall shape using an X-Y plotter, which has a relatively simple structure compared to existing technology, and detailed tactile and temperature information may be provided using only a single additional component, namely the haptic head. Therefore, there is no need to produce hundreds of thousands to millions of microarrays in order to represent 2-dimensional information displayed on a screen. Accordingly, a reduction in production costs, the implementation of a lightweight device, a reduction in operating costs, the expansion of application fields, and a dramatic improvement in resolution may be realized.

Figure 3:
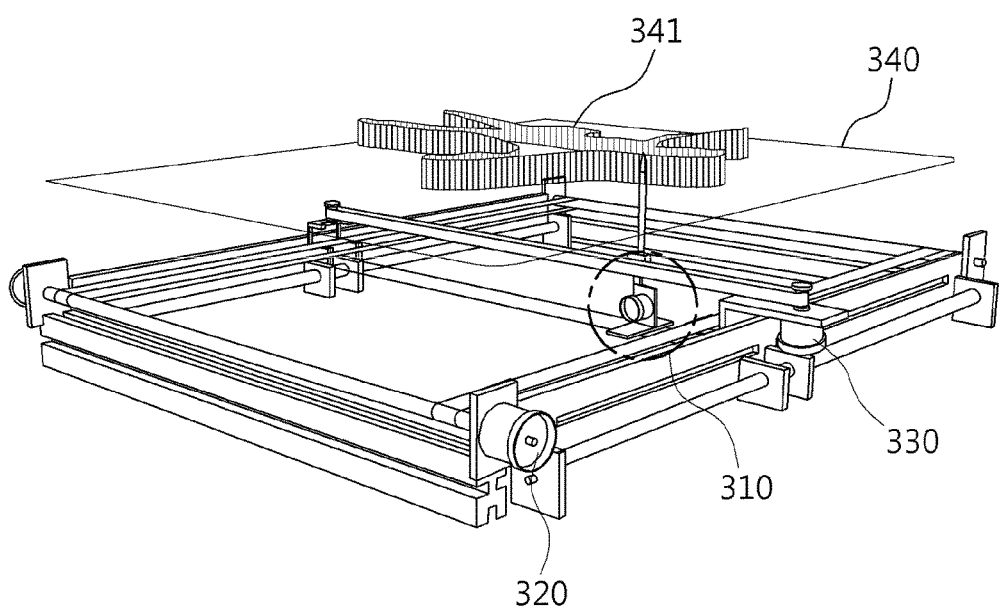
FIG. 3 is a view illustrating a display device using an X-Y plotter according to an embodiment of the present invention.

FIG. 3 is a view illustrating a display device using an X-Y plotter according to an embodiment of the present invention.

Referring to FIG. 3, the display device using an X-Y plotter according to an embodiment of the present invention may create a 3-dimensional shape by protruding a silicon cover 340 by moving a haptic head 310 installed in a general X-Y plotter.

Here, the haptic head 310 may move along the X-axis and Y-axis of the X-Y plotter. Specifically, the hybrid display control device may move the haptic head 310 so as to place it at the coordinates of the shape to be displayed by controlling each of an X-axis drive motor 320 and a Y-axis drive motor 330 of the X-Y plotter.

Here, the haptic head 310 may protrude the silicon cover 340 at the position corresponding to the shape coordinates by moving partway along the Z-axis of the X-Y plotter or using a pin array included in the haptic head 310.

Accordingly, the 3-dimensional shape according to the present invention may be displayed as a protruding shape 341 that can be touched with the user's hands, as shown in FIG. 3.

Here, the pin array included in the haptic head 310 may provide warmth to the protruding shape 341 in order to present not only tactility but also a sense of temperature. For example, when the haptic head 310 includes a vibration motor and the vibration motor conveys vibrations to the multiple pins included in the pin array, wires that are wound around the multiple pins vibrate slightly and thereby generate heat, thus providing a sense of temperature. Alternatively, when a signal is delivered to multiple pins that are made of thermoelements, the multiple pins generate heat, whereby a sense of temperature may be provided.

Here, a different kind of layer having an effect similar to that of the silicon cover 340 can be used as a layer for forming a 3-dimensional shape, in addition to the silicon cover 340.

Figure 4:
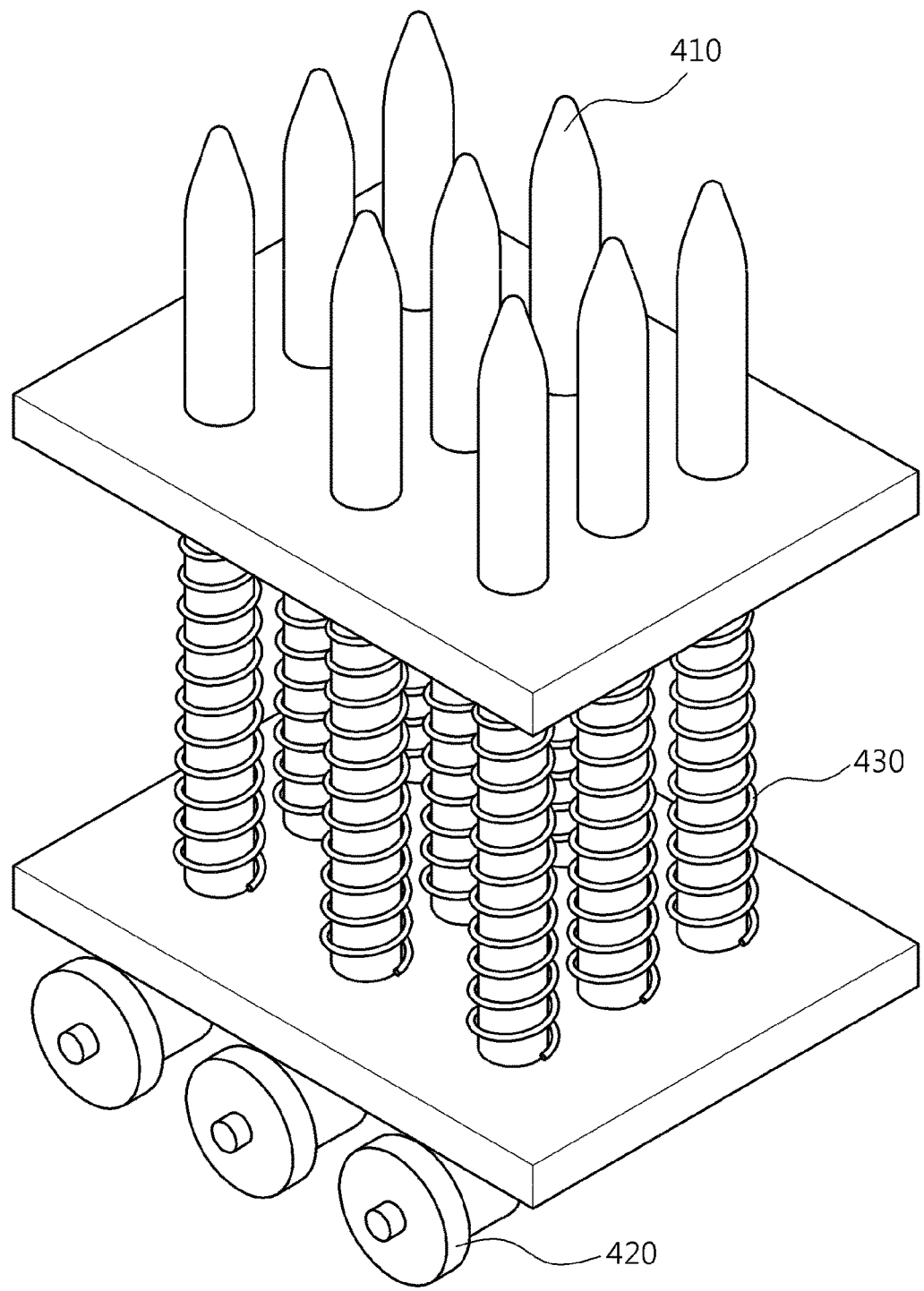
FIG. 4 is a view illustrating a haptic head installed in the hybrid display device illustrated in FIG. 3.

FIG. 4 is a view illustrating the haptic head installed in the hybrid display device illustrated in FIG. 3.

Referring to FIG. 4, the haptic head installed in the hybrid display device illustrated in FIG. 3 includes a pin array 410, which is used in order to represent an elaborate texture in the 3-dimensional shape. Specifically, when a silicon cover is protruded to correspond to the shape of an object to be represented, a part having an elaborate texture may be represented by protruding the silicon cover using the multiple pins of the pin array 410. Also, the contour of the object or a part having a rough texture may be represented by protruding the silicon cover by moving the haptic head itself along the Z-axis of the X-Y plotter.

Here, a sense of temperature may be presented, along with the tactility of the 3-dimensional shape, using the pin array 410. For example, vibrations are conveyed to each of the multiple pins using the vibration motor 420 illustrated in FIG. 4. Here, vibrations are conveyed to the hot wires 430, which are wound around the multiple pins, and heat may be generated as the wires 430 vibrate slightly. The generated heat is delivered to a user, whereby a sense of temperature may be provided.

Figure 5:
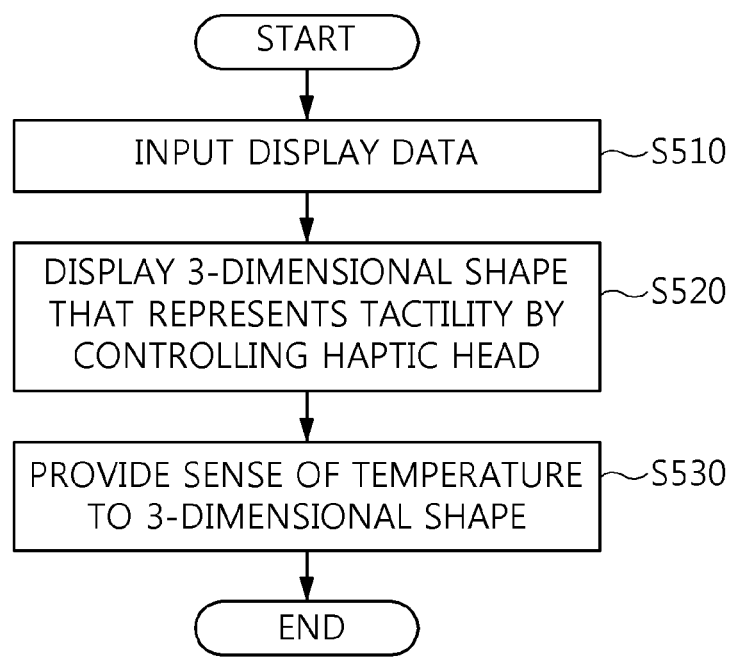
FIG. 5 is a flowchart illustrating a method for controlling a hybrid display according to an embodiment of the present invention.

FIG. 5 is a flowchart illustrating a method for controlling a hybrid display according to an embodiment of the present invention.

Referring to FIG. 5, in the method for controlling a hybrid display according to an embodiment of the present invention, display data for presenting both tactility and a sense of temperature are input from a user at step S510.

Here, the display data may be data that include information about the 2-dimensional shape of the object to which a user intends to present tactility and a sense of temperature.

Also, the display data may include information about the contour of the object to be reproduced or the detailed internal shape of the object.

Here, the display data may include at least one of shape data, which include shape coordinates for representing a 3-dimensional shape, and temperature data, which include temperature coordinates for providing a sense of temperature.

Here, the shape coordinates may be the coordinates of the position at which the 3-dimensional shape is to be displayed on a specific layer, on which 3-dimensional shapes are displayed. Also, the temperature coordinates may be the coordinates of the position at which both tactility and a sense of temperature are provided on the specific layer, on which 3-dimensional shapes are displayed.

Also, in the method for controlling a hybrid display according to an embodiment of the present invention, the 3-dimensional shape that provides tactility is displayed at step S520 by controlling the haptic head installed in the X-Y plotter based on the display data. That is, the 3-dimensional shape may be displayed by moving the haptic head to correspond to the display data using the X-Y plotter.

Here, the 3-dimensional shape may be a shape that can be touched with user's hands or skin. For example, if a 2-dimensional bar graph is represented as a 3-dimensional shape, the bar on the graph may be represented as a shape that can be touched with the hands. Also, in another example, a human heart is represented as a 3-dimensional shape in the medical field, whereby the shape and texture of the heart figure may be realized so as to be touchable.

Here, the 3-dimensional shape may be displayed by protruding a silicon cover, which is horizontally located over the X-Y plotter, to correspond to the shape coordinates using the haptic head that moves along the X-axis and Y-axis of the X-Y plotter. Specifically, the 3-dimensional shape may be displayed in such a way that, when the haptic head reaches the shape coordinates at which the 3-dimensional shape is to be displayed while moving under the silicon cover, the haptic head causes the silicon cover to protrude at the corresponding position.

Here, the silicon cover may have a size corresponding to the X and Y axes of the X-Y plotter. That is, because the coordinates on the silicon cover are connected with the shape coordinates based on the X and Y axes of the X-Y plotter, the 2-dimensional data that a user intends to represent may be displayed so as to correspond to a 3-dimensional shape.

Also, in addition to a silicon cover, a layer made of another material, which has an effect similar to that of the silicon cover, can be used as a shaping layer for forming a 3-dimensional shape.

Here, the silicon cover may be protruded using at least one of a method in which the haptic head moves partway along the Z-axis of the X-Y plotter at the position corresponding to the shape coordinates and a method in which multiple pins protrude from a pin array, which is included in the haptic head, to correspond to the shape coordinates. That is, in order to protrude the silicon cover, it is necessary to push out the silicon cover using the haptic head, which moves through the X-Y plotter. Therefore, the silicon cover may be protruded by moving the haptic head partway along the Z-axis, which corresponds to the orientation of the silicon cover, or by protruding the pin array included in the haptic head.

Here, in the surface of an object corresponding to the 3-dimensional shape, a part having a relatively rigid and rough texture can be reproduced by mechanically moving the haptic head itself along the Z-axis. Also, a part having a sharp and elaborate texture may be reproduced by protruding multiple pins using a pin array included in the haptic head.

Here, the haptic head may be moved by controlling at least one of an X-axis drive motor and a Y-axis drive motor of the X-Y plotter to correspond to the shape coordinates. That is, the haptic head may be moved to correspond to the shape coordinates by controlling both the X-axis drive motor and the Y-axis drive motor simultaneously, or by controlling the X-axis drive motor and the Y-axis drive motor individually.

Here, the X-axis drive motor and the Y-axis drive motor may be controlled by transmitting instruction data for controlling each of the motors to the X-Y plotter. For example, a control signal of a stepper motor driver is input in order to operate the X-Y plotter, and the operation may be controlled using the Arduino platform or a LabVIEW module. Here, a fundamental drive system for the X-Y plotter may be controlled using USB devices of National Instruments, and other parts may be controlled by connecting an Arduino system thereto.

Also, in the method for controlling a hybrid display according to an embodiment of the present invention, a sense of temperature is provided to the 3-dimensional shape based on the display data at step S530. That is, a sense of temperature may be provided to enable a user to feel a sense of warmth at a specific part when touching the 3-dimensional shape, which is displayed by protruding a silicon cover.

Here, the sense of temperature may be provided by conveying vibrations at a preset frequency to the multiple pins at the position corresponding to the temperature coordinates using a vibration motor connected to the haptic head.

For example, when a human hand is represented as a 3-dimensional shape according to the present invention, it may be assumed that the 3-dimensional shape is displayed such that the sense of warmth is provided only to the palm. Here, among the coordinates on the silicon cover, the coordinates corresponding to the palm are set as temperature coordinates, and the preset frequency of vibration is conveyed to the multiple pins while the palm is displayed, whereby a sense of temperature may be presented to the part corresponding to the palm in the protruding silicon cover.

Here, the multiple pins may provide a sense of temperature using at least one of thermoelements and hot wires. For example, a sense of temperature may be provided in such a way that a Peltier module, which is one kind of thermoelement, is applied to the multiple pins and heat is absorbed into or output by the Peltier module when power is supplied thereto. As another example, if hot wires are wound around the multiple pins and vibrations are conveyed thereto using a vibration motor, the vibration are not immediately delivered to the user's hand on the 3-dimensional shape, but soft vibrations are conveyed via the wires wound around the multiple pins, whereby a sense of temperature may be provided.

Here, because the pin array for providing a sense of temperature is mounted on the haptic head, both tactility and a sense of temperature are presented at the same time based on consecutive movements of the haptic head.

Here, a signal generator may be used in order to deliver a signal for providing the sense of temperature at the position corresponding to the temperature coordinates.

As described above, according to the present invention, two kinds of important information, which cannot be presented by general display devices, that is, tactility and the sense of temperature, may be provided.

For example, until now, the visually impaired may recognize characters using a Braille system, but cannot recognize 2-dimensional or 3-dimensional information displayed on a screen. Also, in order to represent such information displayed on a screen using conventional technology, a minimum of hundreds of thousands to millions of microarrays is needed, and thus the size of a display device may exceed hundreds of inches. Also, because Electro-Active Polymers (EAPs) require voltage of thousands of volts in order to operate and the resolution thereof is inferior to that of the mechanical microarrays, it is difficult to use them in practical.

However, the present invention may represent an entire shape using an X-Y plotter, which has a relatively simple structure compared to existing technology, and detailed tactile and temperature information may be provided using only a single additional component, namely the haptic head. Therefore, there is no need to produce hundreds of thousands to millions of microarrays in order to represent 2-dimensional information displayed on a screen. Accordingly, a reduction in production costs, the implementation of a lightweight device, a reduction in operating costs, the expansion of application fields, and a dramatic improvement in resolution may be realized.

Figure 6:
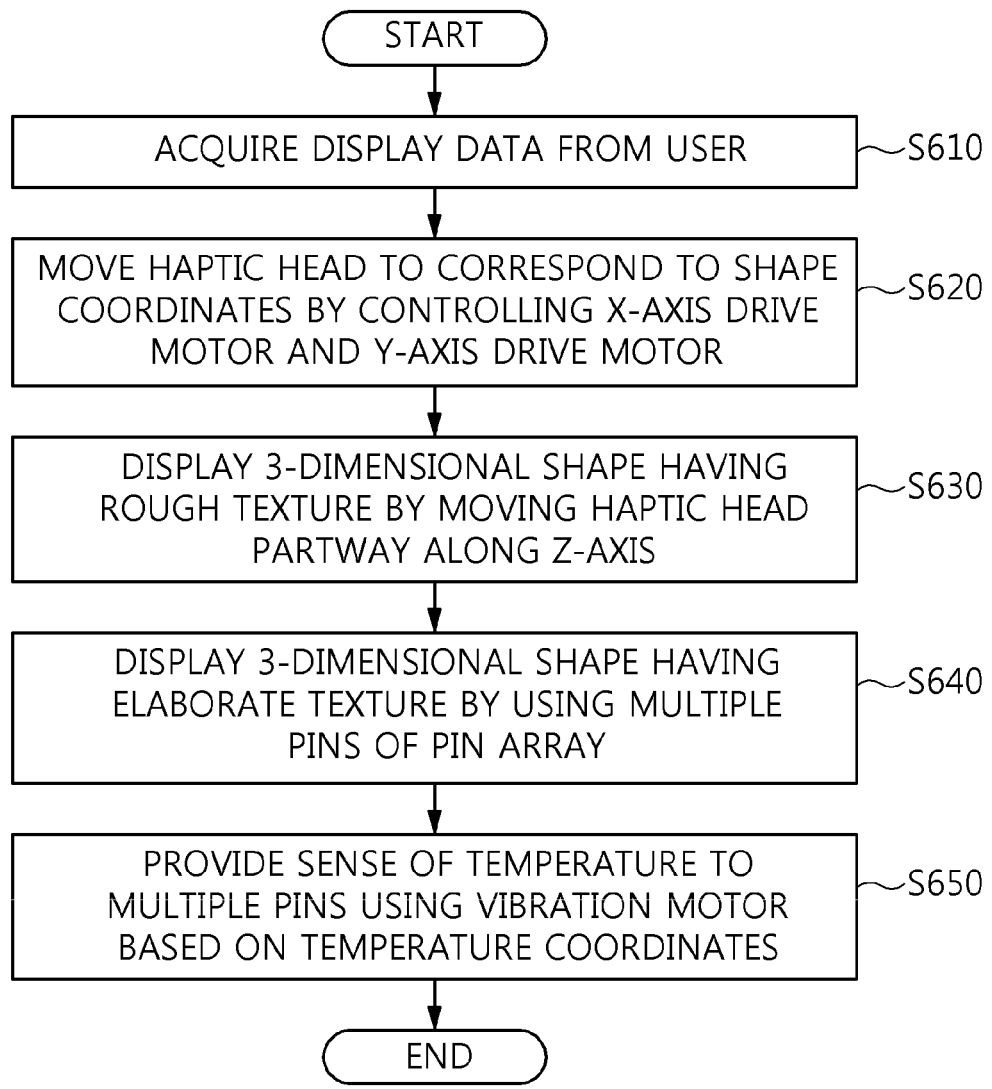
FIG. 6 is a flowchart illustrating a method for controlling a hybrid display according to an embodiment of the present invention in detail.

FIG. 6 is a flowchart illustrating a method for controlling a hybrid display according to an embodiment of the present invention in detail.

Referring to FIG. 6, in the method for controlling a hybrid display according to the present invention, display data are acquired from a user at step S610.

Here, the display data may be data that include information about the 2-dimensional shape of an object to which a user intends to impart tactility and a sense of temperature. Accordingly, the display data may include at least one of shape data, which include shape coordinates corresponding to the shape of the object, and temperature data, which include temperature coordinates.

Then, a haptic head is moved to correspond to the shape coordinates at step S620 by controlling an X-axis drive motor and a Y-axis drive motor of an X-Y plotter. Here, because the haptic head is installed in the X-Y plotter, the haptic head may move along the X-axis and Y-axis of the X-Y plotter. In this case, the movement of the haptic head may be controlled based on a signal that is input by a user in order to operate the X-Y plotter.

Then, in the 3-dimensional shape to be displayed, a part having a rough texture is displayed at step S630 by moving the haptic head partway along the Z-axis of the X-Y plotter.

Here, the 3-dimensional shape, displayed as a protrusion on the silicon cover, may be represented by pushing out the silicon cover, which is horizontally located over the X-Y plotter, by moving the haptic head partway along the Z-axis.

Here, in the surface of an object corresponding to the 3-dimensional shape, a part having a relatively rigid and rough texture may be reproduced by mechanically moving the haptic head itself along the Z-axis. In this case, a drive motor for mechanically moving the haptic head along the Z-axis may be installed in the haptic head.

Subsequently, in the 3-dimensional shape to be displayed, a part having an elaborate texture is displayed at step S640 using multiple pins of a pin array included in the haptic head.

Here, in the surface of the object corresponding to the 3-dimensional shape, a part having a sharp and elaborate texture may be reproduced by protruding multiple pins using a pin array included in the haptic head.

Subsequently, a sense of temperature is provided to the 3-dimensional shape at step S650 by conveying vibrations to the multiple pins of the pin array using a vibration motor installed in the haptic head based on the temperature coordinates. That is, when a user touches the 3-dimensional shape, which is displayed as a protrusion on the silicon cover, a sense of temperature may be provided so as to enable the user to feel warmth at the part corresponding to the temperature coordinates.

Here, when a signal generated by an additional signal generator is transmitted to a vibration motor, the small vibration motor corresponding to the multiple pins may generate vibrations to be adapted for a preset input frequency. The generated vibrations are not immediately delivered to the user's hands, but are delivered to wires wound around the multiple pins, whereby a sense of temperature may be provided along with the soft vibrations.

Here, the multiple pins may be made of a Peltier module in order to provide a sense of temperature, or a sense of temperature may be provided using hot wires.

According to the present invention, there is provided technology for controlling a hybrid display that may convey haptic or tactile information, which cannot be provided by a visual display, along with a 2-dimensional or 3-dimensional model.

Also, the present invention may provide a device for displaying figures, graphs, and pictures on printouts such as books using tactility or a sense of touch provided by applying force, rather than using the sense of sight, as is provided through currently used CRT, LCD, and OLED displays.

Also, the present invention may provide technology for controlling a hybrid display that is capable of effective delivery of information in application fields such as educational tools for the visually handicapped or surgery simulations in the medical field.

Also, the present invention does not need to produce hundreds of thousands to millions of microarrays in order to provide a display device that provides both tactility and a sense of temperature. Therefore, production costs may be significantly reduced and a lightweight device may be implemented.

As described above, an apparatus and method for controlling a hybrid display that provides both tactility and a sense of temperature according to the present invention are not limitedly applied to the configurations and operations of the above-described embodiments, but all or some of the embodiments may be selectively combined and configured so that the embodiments may be modified in various ways.

What is claimed is:

1. An apparatus for controlling a hybrid display, comprising:
    a data acquisition unit for receiving display data for representing both tactility and a sense of temperature from a user;
    a shape control unit for displaying a 3-dimensional shape that provides tactility by controlling a haptic head installed in an X-Y plotter based on the display data; and
    a temperature control unit for providing a sense of temperature to the 3-dimensional shape based on the display data,
    wherein the shape control unit displays the 3-dimensional shape by protruding a silicon cover, which is located horizontally over the X-Y plotter, using the haptic head, which moves along an X-axis and a Y-axis of the X-Y plotter, and
    wherein the shape control unit is configured to generate a first part of the 3-dimensional shape by protruding a first portion of the silicon cover using the haptic head that moves along a Z-axis of the X-Y plotter and generate a second part of the 3-dimensional shape by further protruding a part of the first portion as a second portion using multiple pins of a pin array, which is included in the haptic head.

2. The apparatus of claim 1, wherein the display data include at least one of shape data, which include shape coordinates for displaying the 3-dimensional shape, and temperature data, which include temperature coordinates for providing the sense of temperature.

3. The apparatus of claim 2, wherein the temperature control unit provides the sense of temperature by conveying vibrations corresponding to a preset frequency to the multiple pins at a position corresponding to the temperature coordinates using a vibration motor connected to the haptic head.

4. The apparatus of claim 2, wherein the multiple pins provide the sense of temperature based on at least one of a thermoelement and a hot wire.

5. The apparatus of claim 2, wherein the shape control unit moves the haptic head by controlling at least one of an X-axis drive motor and a Y-axis drive motor of the X-Y plotter to correspond to the shape coordinates.

6. The apparatus of claim 1, wherein the haptic head further includes a plurality of hot wires, the plurality of hot wires being wound around lower portions of the multiple pins, respectively, a vibration motor coupled to the haptic head.

7. A method for controlling a hybrid display, comprising:
    receiving display data for representing both tactility and a sense of temperature from a user;
    displaying a 3-dimensional shape that provides tactility by controlling a haptic head installed in an X-Y plotter based on the display data; and
    providing a sense of temperature to the 3-dimensional shape based on the display data,
    wherein displaying the 3-dimensional shape comprises:
    generating a first part of the 3-dimensional shape by protruding a first portion of a silicon cover using the haptic head that moves along a Z-axis of the X-Y plotter; and
    generating a second part of the 3-dimensional shape by further protruding a part of the first portion as a second portion of the silicon cover using multiple pins of a pin array, which is included in the haptic head.

8. The method of claim 7, wherein the display data include at least one of shape data, which include shape coordinates for displaying the 3-dimensional shape, and temperature data, which include temperature coordinates for providing the sense of temperature.

9. The method of claim 8, wherein the sense of temperature is provided by conveying vibrations corresponding to a preset frequency to the multiple pins at a position corresponding to the temperature coordinates using a vibration motor connected to the haptic head.

10. The method of claim 9, wherein the multiple pins provide the sense of temperature based on at least one of a thermoelement and a hot wire.

11. The method of claim 8, wherein displaying the 3-dimensional shape further comprises moving the haptic head by controlling at least one of an X-axis drive motor and a Y-axis drive motor of the X-Y plotter to correspond to the shape coordinates.

12. The method of claim 6, wherein generating the first part of the 3-dimensional shape includes generating the first part of the 3-dimensional shape that has a rigid and rough texture, and wherein generating the second part of the 3-dimensional shape includes generating the second part of the 3-dimensional shape that has a sharp and elaborate texture.

\* \* \* \* \*